United States Patent [19]

Paulson

[11] Patent Number: 4,892,666

[45] Date of Patent: Jan. 9, 1990

[54] SKIMMING APPARATUS AND METHOD

[76] Inventor: Douglas A. Paulson, 10931 Rainier Ave. S., Seattle, Wash. 98178

[21] Appl. No.: 255,066

[22] Filed: Oct. 7, 1988

[51] Int. Cl.[4] ................................................ C02F 1/40
[52] U.S. Cl. .................................... 210/776; 210/800; 210/242.3; 210/521; 210/923
[58] Field of Search ............... 210/776, 800, 923, 172, 210/242.3, 256, 513, 521

[56] References Cited

U.S. PATENT DOCUMENTS

| | | | |
|---|---|---|---|
| 781,093 | 1/1905 | Post | 210/513 |
| 1,107,391 | 8/1914 | Welch | 210/242.3 |
| 2,330,508 | 9/1943 | McColl | 210/242.3 |
| 2,608,300 | 8/1952 | Small | 210/242.3 |
| 3,086,472 | 4/1963 | Lorenzetti | 210/923 |
| 3,616,923 | 11/1971 | Haley | 210/242.3 |
| 3,642,140 | 2/1972 | Parker | 210/923 |
| 3,702,134 | 11/1972 | Henning, Jr. et al. | 210/242.3 |
| 3,810,546 | 5/1974 | Oxenham | 210/923 |
| 3,849,308 | 11/1974 | Westerman | 210/242.3 |
| 4,146,482 | 3/1979 | Shyu | 210/242.3 |

FOREIGN PATENT DOCUMENTS

| | | |
|---|---|---|
| 2657488 | 6/1978 | Fed. Rep. of Germany . |
| 2560903 | 9/1985 | France . |
| 52-1615 | 1/1977 | Japan . |
| 52-5179 | 1/1977 | Japan . |
| 2006037 | 5/1979 | United Kingdom . |

Primary Examiner—Richard V. Fisher
Assistant Examiner—Christopher Upton
Attorney, Agent, or Firm—Seed and Berry

[57] ABSTRACT

A method and apparatus for removing a fluid from an immiscible fluid composition including a floating liquid and a carrying liquid are disclosed. A body having floatation supports, means to permit rotation about a horizontal plane and free movement in a vertical plane, and an internal cavity is disposed in the immiscible composition, and the floating liquid is allowed to enter the cavity. The floating liquid in the cavity is skimmed by a slidable pickup conduit disposed coaxially with a receiving conduit coextensive with the bottom of the cavity, and is then removed from the cavity.

29 Claims, 4 Drawing Sheets

SKIMMING APPARATUS AND METHOD

FIELD OF THE INVENTION

This invention relates to the field of fluid skimmers and more particularly to an apparatus adapted to remove a floating layer of liquid from a carrying layer of liquid in a fluid composition of immisicible liquids.

BACKGROUND OF THE INVENTION

Fluid skimmers have been used for many years for separating one or more immiscible fluids in a fluid composition. One common application of skimmers is for removing oil from contaminated water.

Most skimmers used in the past employ floating type collectors which float on the surface of the liquid being skimmed and which are coupled to an outlet with a flexible hose. An example of this type of skimmer is shown in U.S. Pat. No. 3,616,923 invented by Ernest K. Haley. This type of skimmer includes a floating chamber having a collection slot which is partially submerged and partially exposed. This skimmer has several disadvantages. Because the collection slot is partially exposed, debris can enter the slot thus clogging the skimmer and reducing the efficiency of the skimmer or blocking it completely. In addition, as the level of the fluid in 2 storage tanks or separation vessels falls, the flexible hose may rise to the surface of the fluid if insufficient fluid is available to fill the hose. In this case, the flexible hose fills with air and a vapor lock may develop. If a vapor lock develops, the skimmer may not restart when needed.

Another floating type skimmer is shown in U.S. Pat. No. 1,107,391, invented by Welch. This skimmer is also coupled to a flexible hose and is also prone to the vapor lock problem described above. In addition to this problem, this skimmer uses a annular screen surrounding the intake of the skimmer to prevent the entry of debris. However, if any significant wave action is present, or if the skimmer is used in an open environment, debris may be washed over the screen or fall in the uncovered top of the device thus clogging it. In addition, the buoyancy of this skimmer changes as it fills with oil or when oil is removed. Therefore, it is impossible to control the depth of the skim with any accuracy.

In addition to the problems noted above, skimmers which employ flexible hoses drift in an uncontrolled manner in the fluid being skimmed. It is therefore difficult to control the exact position of the skimmer making it impossible to skim to very precise depths. In addition, in situations where water accumulates in the flexible hose, oil will be unable to dislodge the water thus blocking skimmer operation.

Another type of skimmer is shown in U.S. Pat. No. 3,702,134, invented by Henning. With this type of skimmer, rigid tubing supports the skimmer apparatus. However, the flat surface of the skimmer is prone to collecting debris thus changing the buoyancy of the skimmer and affecting the accuracy of the skim depth. In addition, the drain lines of this apparatus must be constantly filled with fluid to maintain equilibrium in the complicated counterbalance system used in this device.

From the foregoing, no skimming apparatus is known which is highly resistant to debris, which is self-adjusting and self-leveling and which provides a highly accurate and controllable skim depth in a wide variety of conditions.

SUMMARY AND OBJECTS OF THE INVENTION

Briefly described, the present invention contemplates an improved apparatus from removing a fluid from an immiscible fluid composition including a floating liquid and a carrying liquid. The present invention includes a body having an internal cavity, a plurality of sidewalls, a substantially horizontal slot disposed in at least one sidewall of the body for coupling the internal cavity to the exterior of the body to allow the floating liquid to enter the cavity, and a receiving conduit disposed in an orientation which is parallel with respect to said side walls wherein the top surface of the receiving conduit is approximately coextensive with the lowermost portion of the internal cavity. A plurality of floats are disposed on opposing sides of the body for supporting the apparatus in the fluid composition. A slidable pickup conduit is disposed coaxially within the receiving conduit in watertight relation for skimming the floating liquid from the fluid composition within the internal cavity. A discharge conduit is coupled to the receiving conduit and slidable conduit combination and an intermediate conduit is coupled to the discharge conduit with coupling means which permits movement in a vertical direction and restricts movement in either horizontal direction. A discharge plate adapted for mounting to a fixed location is provided wherein the dishcarge plate is coupled to the intermediate conduit with coupling means which permits movement in a vertical direction and restricts movement in either horizontal direction thus allowing the present apparatus to move freely in a vertical plane without any substantial horizontal drift.

Accordingly, it is an object of the present invention to provide an improved skimming apparatus which is highly resistant to clogging due to wave action.

It is another object of the present invention to provide an improved skimming apparatus which is highly resistant to degraded performance due to debris.

It is still another object of the present invention to provide an improved skimming apparatus wherein the depth of the skim is easily adjustable.

It is yet another object of the present invention to provide a skimming apparatus which eliminates vapor lock in the fluid return mechanism.

It is still another object of the present invention to provide a skimming apparatus which is easily cleaned.

It is still another object of the present invention to provide a skimming apparatus which is self-leveling.

BRIEF DESCRIPTION OF THE DRAWING

These and other objects may be fully appreciated through the description below and the accompanying figures of drawing in which.

DETAILED DESCRIPTION OF THE PRESENT INVENTION

Figure 1:
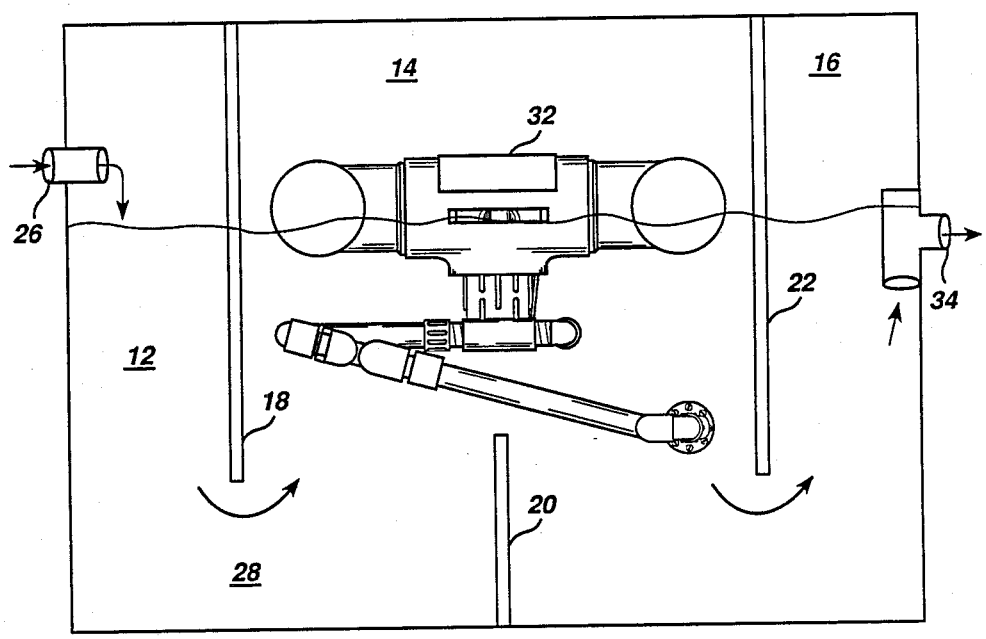
FIG. 1 is a side cutaway view of a typical separation tank which would be used in association with the skimmer apparatus of the present invention.

The present invention is adapted for separating immiscible liquids such as oil and water. It may be used for removing spilled oil from bays, rivers and lakes, etc. or may also be used in a separation tank of the type shown in FIG. 1. The separation tank 10 shown in FIG. 1 is referred to in the industry as an API separator and it comprises three separation chambers 12, 14 and 16 which are separated by a plurality of baffles 18, 20, and 22. An API separation tank may typically hold approximately 300 gallons. An oil and water fluid composition enters the separation tank 10 at inlet 26 and flows into a first chamber 12 wherein the baffles 18 and 20 perform a coarse first stage separation. Since oil is floating over the water carrying liquid, the water will flow under the baffle 18 before the oil. Thus, by controlling the fluid flow rates, a significant reduction in the amount of oil present in the water is achieved as the fluid composition enters the interior chamber 14.

The skimming apparatus 32 is typically placed in the interior chamber 14 and is attached to the wall of the separation tank 10 to provide an outlet for oil to be removed from the separation tank 10. The skimming apparatus 32 is capable of removing significant amounts of oil from the water so that when used in conjunction with baffles 18, 20, and 22, the fluid exiting outlet 34 will have oil concentrations of only a few hundred parts per million which represents a substantial improvement over skimmers known in the art.

Figure 2:
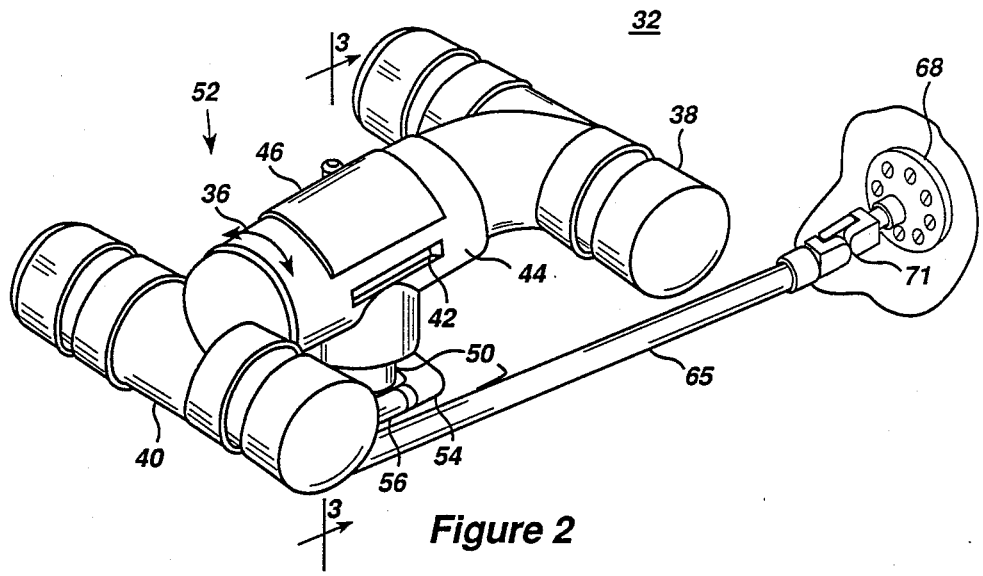
FIG. 2 is an isometric view of the present invention.
Figure 3:
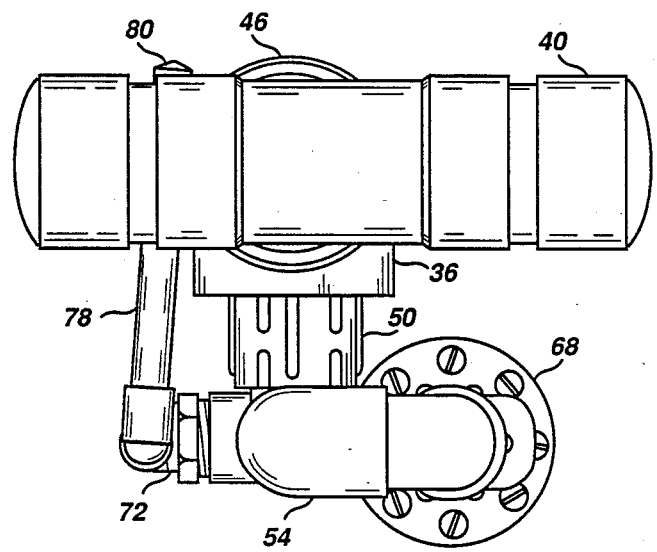
FIG. 3 is a side elevational view of the present invention.

FIG. 2 is an isometric view in perspective of the skimming apparatus 32. The skimming apparatus 32 includes a body which is supported on either side by flotation members 38, 40. The body 36 and the flotation members 38 and 40 are suitably cylindrical in shape to prevent debris from accumulating on the surfaces thereof. The body 36 and flotation members 38, 40 may suitably be constructed of a well known polyvinyl chloride (PVC) material although many other materials would perform satisfactorily in this application. The flotation members 38 and 40 are attached to the body 36 in a conventional manner which permits the flotation members 38, 40 to be rotated with respect to body 36. This may be achieved with a friction fit and when the desired position of the respective flotation member is achieved, the flotation members may be secured with a set screw (not shown). In the preferred practice of the present invention, the body 36 may suitably be constructed of a 4" PVC "T" coupler. The flotation members may suitably be constructed of 4" "T" couplers with a coupling conduit and a capping member closing each side of the "T" coupler. The respective "T" couplers are then assembled as shown in the accompanying Figures of the drawings.

A substantially horizontal slot is disposed in the sidewall 44 of body 36 to permit fluid to flow from the exterior of the body 36 to the internal cavity of body 36 which is further described below. Access to the interior cavity of body 36 is achieved by removing panel 46 which conforms in shape to the body 36. The panel 46 is held in place with a set screw 48 which is most clearly seen in FIG. 4. The body 36 further includes a receiving conduit 50 which extends downward in a direction which is perpendicular with respect to the flotation members 38, 40. The receiving conduit 50 forms a stem which supports the body 36 and flotation members 38, 40 when it is not floating and provides other functions which will be further discussed below.

Figure 5A:
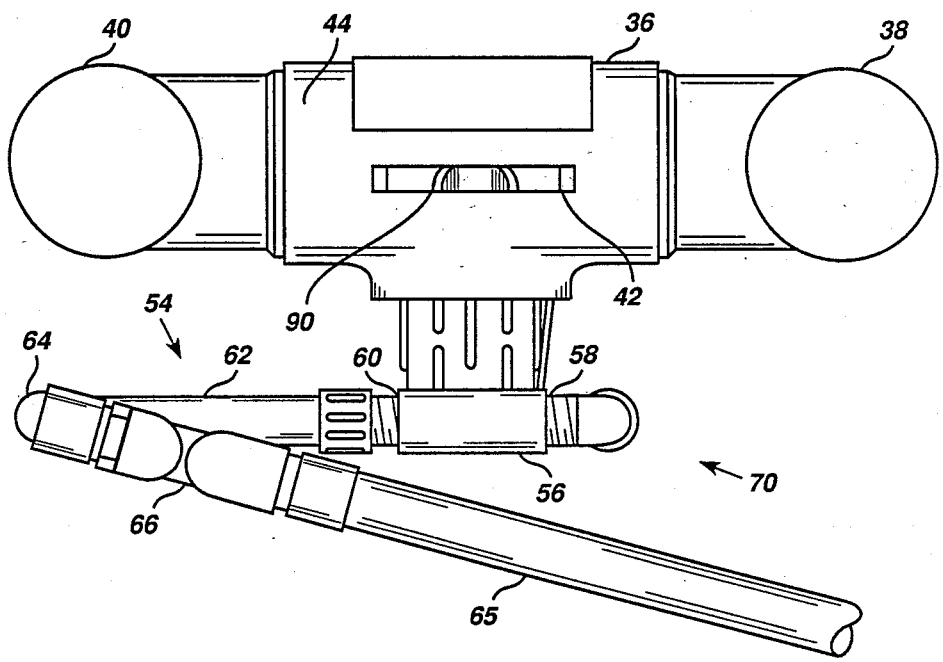
FIG. 5A is a front elevational view of the present invention.
Figure 5B:
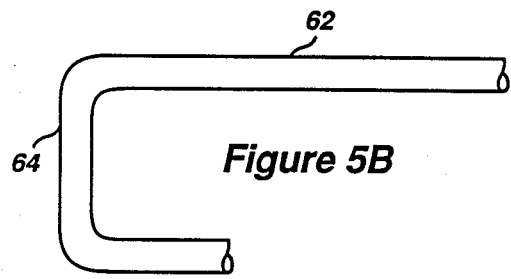
FIG. 5B is a top plan view of the "U" shoulder bend portion of the discharge conduit assembly of FIG. 5A.
Figure 5C:
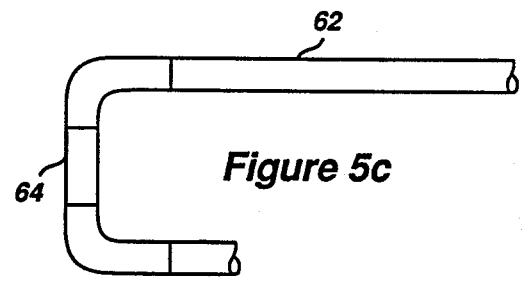
FIG. 5C is an alternate embodiment of the apparatus of FIG. 5C.
Figure 6:
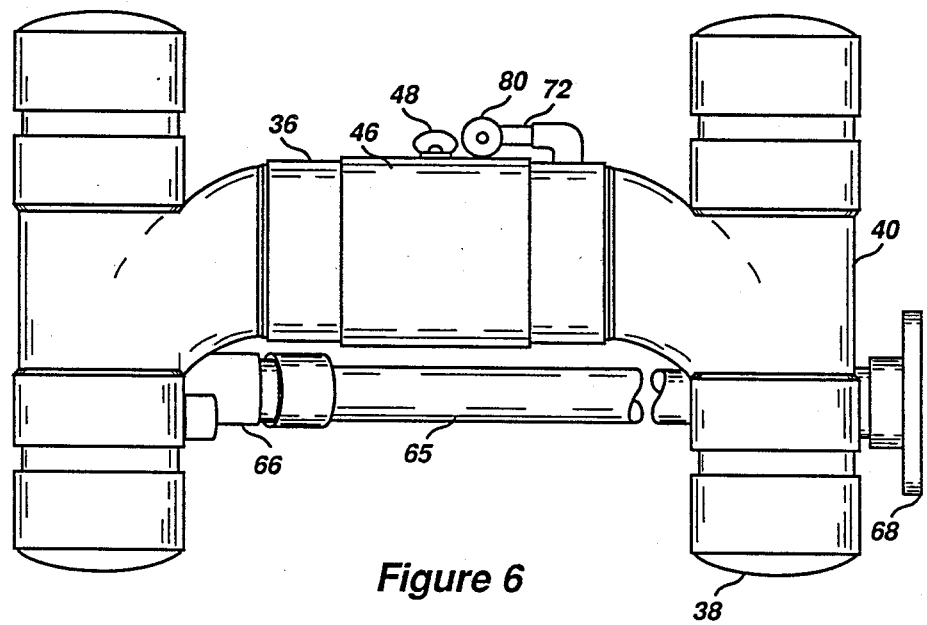
FIG. 6 is a top view of the present invention.

A discharge conduit assembly 54 is coupled to the output of the receiving conduit 50 and extends in a horizontal orientation to carry fluids away from the receiving conduit 50. The discharge conduit assembly 54 includes a "T" coupler 56 which interfaces with the receiving conduit 50 and provides two fluid outlets 58, 60 oriented in opposing directions. The discharge conduit assembly 54 and the "T" coupler 56 is most clearly seen in FIG. 5A. A drain conduit 62 is coupled is to the fluid outlet 60 with conventional means and extends laterally, terminating with a "U" shoulder bend 64 which reverses the lateral extension of the drain conduit 62. The "U" shoulder bend 64 may be formed by conventional means either thermally as shown in FIG. 5B or by widely available PVC coupler elements comprising two 90° bends and a joining member as shown in FIG. 5C. As shown in FIG. 5A, the terminal portion of the "U" shoulder bend 64 is disposed with a downward angular offset with respect to the lateral extension of drain conduit 62.

An intermediate conduit 65 is coupled to the terminal portion of the "U" shoulder bend 64 through a fluid conducting swivel joint 66 which is most clearly seen in FIG. 5A. The fluid conducting swivel joint 66 may be any well known type of conduit coupler which permits vertical movement and rotation about the "U" shoulder bend 6A. In the context of the present invention, the swivel joint 66 is disposed in an orientation which allows movement in a vertical direction while restricting movement in both horizontal directions. The other end of intermediate conduit 65 is coupled to an outlet plate with another fluid conducting swivel joint 71. The outlet plate is most clearly seen in FIG. 1. The fluid conducting swivel joint 71 oriented to allow movement only in the vertical plane while restricting movement on both horizontal planes. The outlet plate 68 is adapted for attachment to any rigid surface such as the wall of the separator tank 10 or to the exterior hull of a waterborne vessel (not shown) to expel the fluid collected by the present skimmer apparatus to an appropriate receiving vessel.

Figure 4:
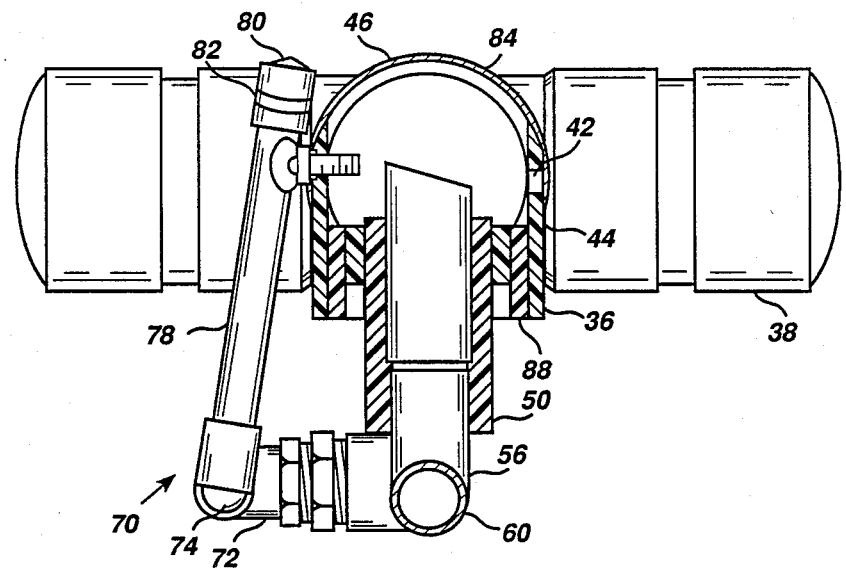
FIG. 4 is a cross sectional view of the float and body assembly of the present invention taken along section 3—3'.

The fluid outlet 58 of "T" coupler 56 is coupled to a vent assembly 70 which is most clearly seen in FIG. 4. The vent assembly 70 includes a substantially horizontal tap conduit 72 which is coupled at one end to the fluid outlet 58 by conventional means. An elbow conduit 74 is attached to tap conduit 72 and provides an outlet 76 which is disposed in an orientation which is substantially perpendicular with respect to the horizontal tap outlet 72. A vent conduit 78 is attached to the elbow conduit 74 by conventional means and extends in a substantially vertical direction to a distance well above the upper edge of slot 42. The vent conduit 78 terminates with a cap member 80 which prevents the entry of debris into the vent conduit 78. The cap member 80 is provided with a slotted opening 82 which is disposed with an upward slat in cap member 80. The upward slant of slotted opening 82 prevents the accumulation of debris within the slotted opening 82.

In one aspect of the present invention, the vent assembly promotes the smooth flow of liquid through the various conduits of the present apparatus. Without the vent assembly 70, the skimming apparatus may be prone to "chugging" thus causing the skimming apparatus to oscillate in the fluid composition and reducing efficiency. The vent assembly 70 eliminates this phenomena and allows the smooth flow of fluid through the skimming apparatus without "chugging" or "gulping".

In another aspect of the present invention, the adjustable flotation members 38, 40 are preferably adjusted such that the slot 42 is located just below the surface of the fluid composition when the skimming apparatus is in use. When used in this configuration, floating debris is prevented from entering the skimming apparatus in contrast to prior skimmers wherein debris often enters the skimmer thus clogging it and reducing performance. In another aspect of the present invention, the various fluid conduits employed in the practice of the present invention are disposed with a volumetric capacity which is approximately 10% greater than that of the slot 42. This feature creates a suction effect about slot 42 when the slot is immersed in fluid and the skimming apparatus is in operation.

Referring now to FIG. 4, the structure of the internal chamber 84 of the body 36 taken along section 3—3' is shown in detail. As shown if FIG. 4, the receiving conduit 50 is coupled to the body 36 with a plurality of annular coupling rings 86, 88 which are retained within the body 36 by conventional means. Similarly, the "T" coupler 56 is also retained within the receiving conduit 50 by conventional means. A pickup conduit 90 is slidably coupled to the receiving conduit 50 in a manner which forms a watertight connection but allows movement of the pickup conduit 90 within the receiving conduit 50 if sufficient force is applied and which retains the pickup conduit in a fixed position if no force is applied. The distal end of the pickup conduit 90 is configured with a beveled surface 92 which includes a skimming edge 94.

As noted above, the immiscible fluid enters the interior chamber 84 of the skimming apparatus 10 through slot 42. Since the interior chamber 84 is isolated from the external environment, the fluid in the interior chamber 84 subject to reduced turbulence and may therefore be skimmed with greater accuracy. In the preferred practice of the present invention, the pickup conduit is adjusted so that the height of the skimming edge 94 relative to the lower edge of slot 42 produces a desired skim depth. The desired skim depth may vary depending on the relative concentration of fluid being skimmed and the present invention allows this depth to be readily adjusted.

The beveled edge 90 also enhances the performance of the skimming apparatus as the skimming edge produces lower resistance to the flow of liquid than would a pickup surface which was flat and horizontal. Therefore, the present skimming apparatus is capable of skimming much thinner layers of liquids than prior known skimming devices.

In summary, an improved skimming apparatus for removing an immiscible liquid from a fluid composition has been described. Other uses and modifications for the present invention will be readily apparent to a person of ordinary skill in the art and all of such uses and modifications are intended to fall within the scope of the appended claims.

I claim:

1. An improved apparatus for removing a fluid from an immiscible fluid composition including a floating liquid and a carrying liquid, comprising:
   (a) a body having internal cavity, a substantially horizontally oriented cylindrical wall, a substantially horizontal slot disposed in the wall of said body for coupling said internal cavity to the exterior of said body to allow said floating liquid to enter said cavity, and a receiving conduit disposed in an orientation which is parallel with respect to said wall wherein the top surface of said receiving conduit is approximately coextensive with the bottom of said internal cavity;
   (b) flotation means disposed on opposing sides of said body for supporting said apparatus in said fluid composition;
   (c) a slidable pickup conduit means disposed coaxially within said receiving conduit in a watertight relation for skimming said floating liquid from the fluid within said internal cavity;
   (d) a discharge conduit coupled to said receiving conduit and slidable conduit combination;
   (e) an intermediate conduit coupled to said discharge conduit with coupling means which permit movement in a vertical direction and allows rotation about said discharge conduit; and
   (f) a discharge plate adapted for mounting to a fixed location, said discharge plate coupled to said intermediate conduit with coupling means which permit movement in a vertical direction and restricts movement in either horizontal direction.

2. The apparatus of claim 1 further including an inspection opening in said body for cleaning and inspection.

3. The apparatus of claim 2 further including a means for covering and sealing said inspection opening.

4. The apparatus of claim 1 further including a vent conduit having a distal end and an end coupled to said discharge conduit wherein said vent conduit is disposed in a substantially vertical orientation.

5. The apparatus of claim 4 wherein the distal end of said vent conduit terminates with a capping means with a cylindrical wall wherein a diagonal slot is disposed in said cylindrical wall.

6. The apparatus of claim 1 wherein a distal end with respect to said receiving conduit of said slidable pickup conduit means is beveled wherein the lowest portion of said beveled distal end comprises a skimming edge.

7. The apparatus of claim 1 wherein said slidable pickup conduit is adjustable to adjust the depth of said floating liquid skimmed by said apparatus.

8. The apparatus of claim 1 wherein said flotation means are rotatably attached to said body to adjust the position of said slot with respect to the uppermost surface of said fluid composition.

9. The apparatus of claim 8 wherein said flotation means are constructed and arranged to be rotated to a position to place said slot in a position wherein the top wall of said slot is slightly below the upper surface of said fluid composition to prevent the entry of debris into said slot.

10. The apparatus of claim 1 wherein said slot includes top bottom and side walls wherein said side walls are beveled.

11. The apparatus of claim 1 wherein said flotation means are cylindrical and disposed in a substantially horizontal orientation to prevent the accumulation of debris on said flotation means.

12. The apparatus of claim 1 wherein the discharge plate is adapted for coupling to the wall of a containment vessel.

13. The apparatus of claim 1 wherein the discharge plate is adapted for coupling to the exterior hull of a floating vessel.

14. An improved apparatus for removing oil from a fluid composition including oil and water, comprising:
(a) a body having an internal cavity, a substantially horizontally oriented cylindrical wall, a substantially horizontal slot disposed in the wall of said body for coupling said internal cavity to the exterior of said body to allow said oil to enter said cavity, and a receiving conduit disposed in an orientation which is parallel with respect to said wall wherein the top surface of said receiving conduit is approximately coextensive with the bottom of said internal cavity;
(b) flotation means disposed on opposing sides of said body for supporting said apparatus in said fluid composition;
(c) a slidable pickup conduit means disposed coaxially within said receiving conduit in a watertight relation for skimming said oil from the fluid within said internal cavity;
(d) a discharge conduit coupled to said receiving conduit and said slidable conduit combination;
(e) an intermediate conduit coupled to said discharge conduit with coupling means which permit movement in a vertical direction and rotation about said discharge conduit; and
(f) a discharge plate adapted for mounting to a fixed location, said discharge plate coupled to said intermediate conduit with coupling means which permit movement in a vertical direction and restricts movement of said intermediate conduit in either horizontal direction.

15. The apparatus of claim 14 further including an inspection opening in said body for cleaning and inspection.

16. The apparatus of claim 14 further including a means for covering and sealing said inspection opening.

17. The apparatus of claim 14 further including a vent conduit coupled to said discharge conduit and disposed in a substantially vertical orientation.

18. The apparatus of claim 17 wherein the distal end of said vent conduit terminates with a capping means with a cylindrical wall wherein a diagonal slot is disposed in said cylindrical wall.

19. The apparatus of claim 14 wherein a distal end, with respect to said receiving conduit, of said slidable pickup conduit means is beveled wherein the lowest portion of said beveled distal end comprises a skimming edge.

20. The apparatus of claim 14 wherein said slidable pickup conduit is adjustable to adjust the depth of oil skimmed by said apparatus.

21. The apparatus of claim 20 wherein said flotation means are constructed and arranged to be rotated to a position to place said slot in a position wherein the top wall of said slot is slightly below the upper surface of said fluid composition to prevent the entry of debris into said slot.

22. The apparatus of claim 14 wherein said flotation means are rotatably attached to said body to adjust the position of said slot with respect to the uppermost surface of said fluid composition.

23. The apparatus of claim 14 wherein said slot includes top bottom and side walls wherein said side walls are beveled.

24. The apparatus of claim 14 wherein said flotation means are cylindrical and disposed in a substantially horizontal orientation to prevent the accumulation of debris on said flotation means.

25. The apparatus of claim 14 wherein discharge plate is adapted for coupling to the wall of a containment vessel.

26. The apparatus of claim 14 wherein the discharge plate is adapted for coupling to the exterior hull of a floating vessel.

27. An improved apparatus for removing a fluid from a immiscible fluid composition including a floating liquid and a carrying liquid, comprising:
(a) a body having an internal cavity, a substantially horizontally oriented cylindrical wall, a substantially horizontal slot disposed in the wall of said body for coupling said internal cavity to the exterior of said body to allow said floating liquid to enter said cavity, and a receiving conduit disposed in an orientation which is parallel with respect to said side wall wherein the top surface of said receiving conduit is approximately coextensive with the bottom of said internal cavity;
(b) flotation means disposed on opposing sides of said body for supporting said apparatus in said fluid composition; and
(c) a slidable pickup conduit means disposed coaxially within said receiving conduit in a watertight relation for skimming said floating liquid from the fluid within said internal cavity.

28. An improved method for removing a fluid from an immiscible fluid composition including a floating liquid and a carrying liquid, said method comprising the steps of:
(a) disposing, in a fluid composition of immiscible liquids, a body having an internal cavity and allowing a fluid composition comprised substantially of said floating liquid to enter said internal cavity;
(b) supporting said body with flotation means in said fluid composition;
(c) skimming said floating liquid from the fluid within said internal cavity with a slidable pickup conduit disposed coaxially with a receiving conduit coextensive with the bottom of said cavity; and
(d) removing said skimmed floating liquid from said internal cavity with means which permit rotation of said body about a horizontal plane while permitting free movement in a vertical plane.

29. An improved apparatus for removing a fluid from a immiscible fluid composition including a floating liquid and a carrying liquid, comprising:
(a) means for disposing, in a fluid composition of immiscible liquids, a body having an internal cavity and allowing said immiscible liquid to enter said internal cavity;
(b) means for supporting said body with flotation means in said fluid composition;
(c) means for skimming said floating liquid from the fluid within said internal cavity with a slidable pickup conduit disposed coaxially within a receiving conduit coextensive with the bottom of said cavity;
(d) means for removing said skimmed floating liquid from said internal cavity with said means allowing free rotation of said body and said flotation means about an axis of rotation while restricting movement of said body in a lateral direction; and
(e) means for adjusting the relative position of said body and said flotation means.

* * * * *